United States Patent
Holweg

Patent Number: 5,445,455
Date of Patent: Aug. 29, 1995

[54] ROLLING BEARING FOR LINEAR MOVEMENT

[75] Inventor: Friedrich Holweg, Heroldsberg, Germany

[73] Assignee: Ina Walzlager Schaeffler KG, Germany

[21] Appl. No.: 232,298

[22] PCT Filed: Jan. 30, 1993

[86] PCT No.: PCT/EP93/00219
§ 371 Date: Apr. 29, 1994
§ 102(e) Date: Apr. 29, 1994

[87] PCT Pub. No.: WO93/20363
PCT Pub. Date: Oct. 14, 1993

[30] Foreign Application Priority Data
Mar. 28, 1992 [DE] Germany .................. 42 10 299.5

[51] Int. Cl.⁶ .................. F16C 29/06; F16C 33/66
[52] U.S. Cl. .................. 384/45; 384/13
[58] Field of Search .................. 384/13, 43, 44, 45

[56] References Cited

U.S. PATENT DOCUMENTS

| | | | |
|---|---|---|---|
| 4,730,945 | 3/1988 | Luther et al. | 384/45 |
| 4,743,124 | 5/1988 | Blaurock | 384/45 |
| 4,850,720 | 7/1989 | Osawa | 384/13 |
| 4,886,374 | 12/1989 | Osawa | 384/13 |
| 4,988,215 | 1/1991 | Osawa | 384/45 X |

FOREIGN PATENT DOCUMENTS

| | | |
|---|---|---|
| 3015430 | 11/1980 | Germany . |
| 3805392 | 8/1989 | Germany . |
| 4041269 | 3/1992 | Germany . |

*Primary Examiner*—Thomas R. Hannon
*Attorney, Agent, or Firm*—Bierman and Muserlian

[57] ABSTRACT

In a roller bearing (1) for the straightline movement of a supporting component (2) along a guide rail (6), the quantity of re-lubrication is to be minimized regardless of the installation position of the roller bearing (1). This is acheived by the invention in that a separate lubricant line (13) is inserted in a channel (10) of a head (8) for the lubricant supply which takes the form of a single-lipped seal (16) in a region in which lubricacant exiet points are desired.

8 Claims, 3 Drawing Sheets

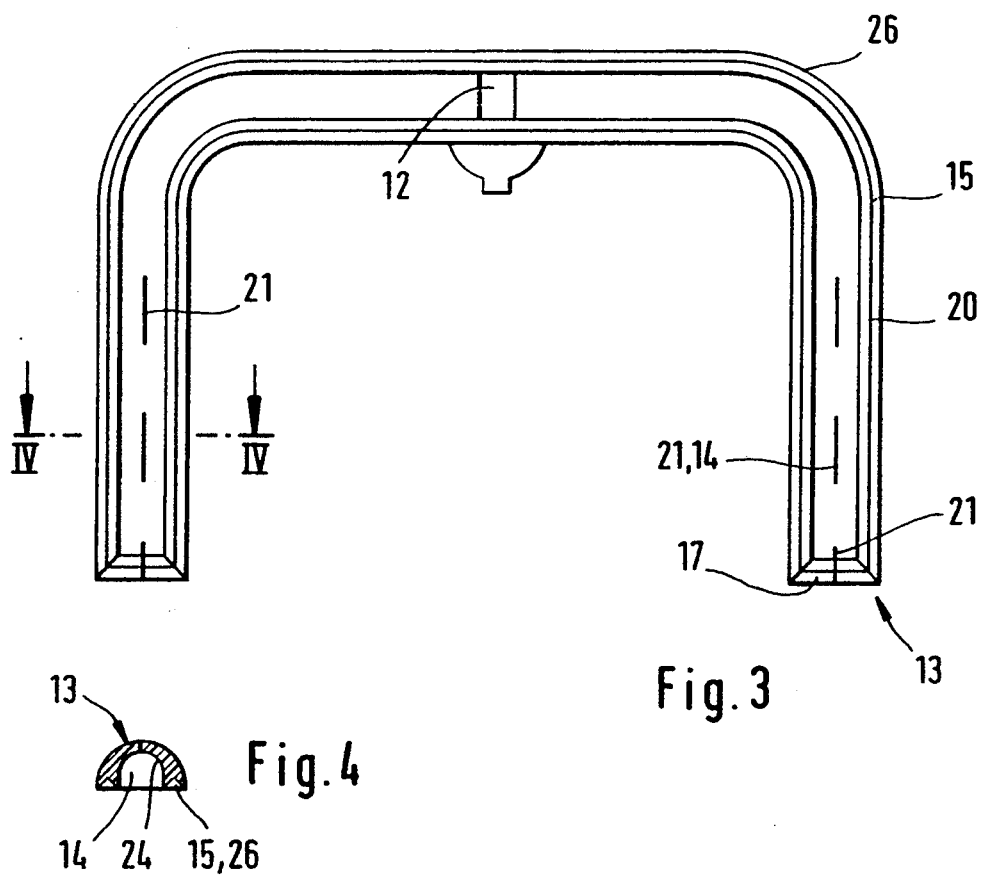
Fig. 3
Fig. 4
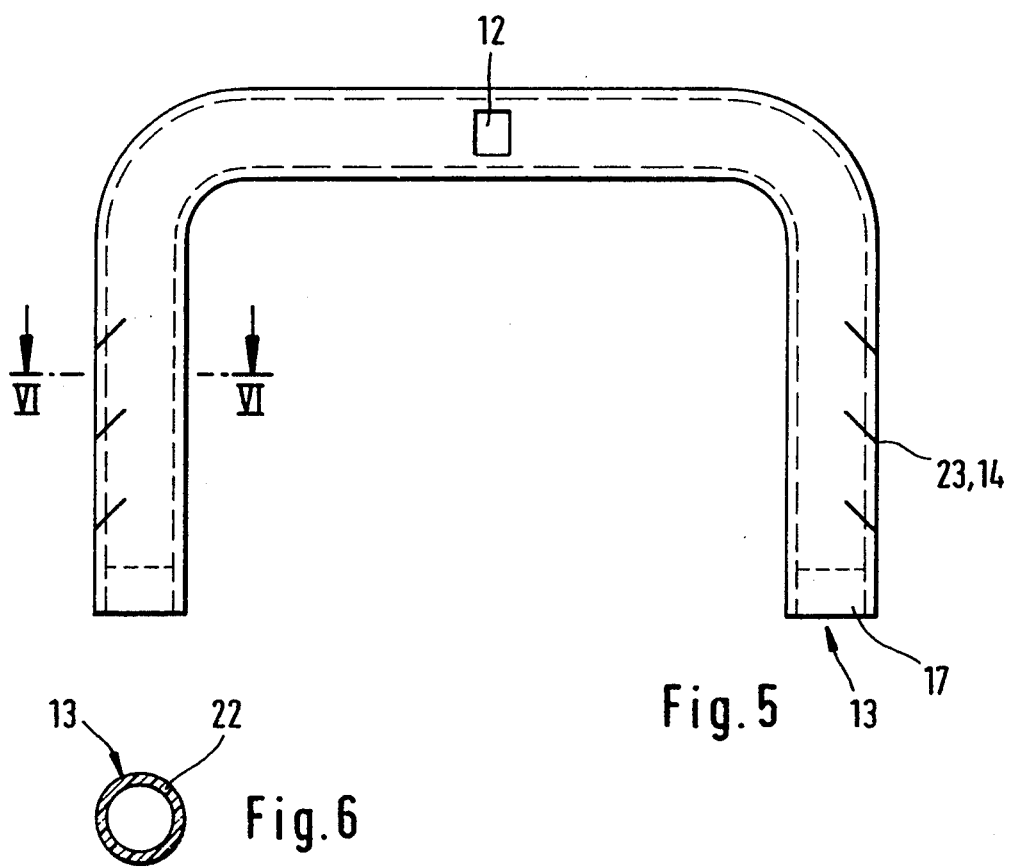
Fig. 5
Fig. 6

ROLLING BEARING FOR LINEAR MOVEMENT

The invention concerns a rolling bearing for linear movement of a carrier along a guide rail, said rolling bearing comprising pairs of rolling element circuits supported on raceways on the carrier and the guide rail, a head piece comprising a region for deflecting the rolling elements being arranged at each front end of the carrier, and at least one of said head pieces comprising a canal for feeding lubricant to the rolling elements.

Such a rolling bearing is known from DE-PS 0 120 093.

This document also shows a rolling bearing for linear movement comprising a carrier mounted longitudinally displaceably on a rail on four pairs of recirculating rolling element rows. The front ends of this generic type of rolling bearing are closed by head pieces. A canal for feeding lubricant to the rolling elements is provided in at least one of these head pieces. This canal is supplied with lubricant by a feed duct and a lubricating nipple.

The disadvantage of the pre-cited rolling bearing is that the lubricant feed canal in the head piece has no valve-like closures or apertures at its exit openings, and moreover, due to unevennesses in the head piece, this canal cannot bear in an absolutely leak-tight manner against the carrier so that undesired lubricant losses can occur. Such lubricant losses necessitate higher minimum amounts of re-lubrication of the rolling bearing, and in the most unfavorable of cases, they can cause discontinuities in the lubricant film so that higher wear and premature failure of the described rolling bearing is to be expected.

Moreover, the arrangement and the configuration of the lubricant canals concerned do not assure a uniform and reliable supply of lubricant to the intended points of lubrication of the rolling bearing in the different installed positions, i.e. a deficiency of lubricant would occur at first in the parts of the lubricant canals which are either furthest away from a central lubricant feed canal or situated in a region located in opposition to the direction of gravity.

The object of the invention is therefore to provide a rolling bearing of the type initially described in which the above-mentioned disadvantages are eliminated and in which particularly, independent of the installed position of the rolling bearing, only minimum amounts of re-lubrication are required to assure a uniform and reliable lubricant supply to the rolling bearing.

The invention achieves this object according to the characterizing part of claim 1 by the fact that a separate lubricant duct comprising radial openings for lubricant exit is inserted into the canal of the head piece.

By means of this separate lubricant duct, the head piece is sealed on the carrier with respect to escaping lubricant. Due to the valve-like configuration of the openings, the amount of re-lubrication required can be considerably reduced because lubricant is transferred through the openings only under pressure and thus an exit of lubricant under the action of gravity is prevented. Moreover, the lubricant feed according to the invention is independent of the installed position of the roller bearing even when low-viscosity oil is used as a lubricant.

Further developments of the invention are described more closely below.

The lubricant duct has a substantially U-shaped cross-section and its lengthwise end which forms an opening bears against the carrier via contact surfaces.

Such a U-shaped lubricant duct is easy to manufacture and its mounting on the head piece also does not present any problems.

The lubricant duct can be made of an elastic polymeric material or any other elastic material.

These materials are readily available and their shaping can be accomplished relatively simply.

It is likewise advantageous to make the lubricant duct out of a light-weight material.

By virtue of this material, and this can also apply to the other materials mentioned above, the total mass of the rolling bearing of the invention is only minimally increased.

The contact surfaces of the lubricant duct bearing against the carrier are configured as double elastic sealing lips which, in the regions of intended lubricant exit points merge into single-lip elastic sealing lips.

This embodiment is an advantageous development of the embodiment of claim 1. By reason of the double elastic sealing lips, an excellent sealing between the head piece and the carrier is assured by simple means.

The elasticity of the single-lip portions of the sealing lip is chosen so that when lubricant is required on the rolling element-side, the sealing lip yields to form an opening of adequate cross-section for the required transfer of lubricant, and when a state of pressure equilibrium prevails between the lubricant duct-side and the rolling element-side of the sealing lip, the sealing lip retains its central position, i.e. it remains closed and thus prevents an undesired continued flow of lubricant.

It is appropriate, to arrange lubricant exit regions in the lubricant duct so that they register respectively with the raceways of the carrier.

In conjunction with the previously mentioned measures, this configuration assures a minimum consumption of lubricant, i.e. the lubricant is only fed to the points where it is required.

The radial openings of the lubricant duct are made in the form of slits which register respectively with the raceways of the carrier.

These simple-to-make slits likewise enable a controlled lubricant supply.

The sealing lips of these slits open only when a sufficient overpressure has been built-up in the lubricant duct, and in a slate of approximate pressure equilibrium, they keep the lubricant duct closed. This variant is also conceivable in combination with the embodiment of claim 4.

The lubricant duct has a substantially annular cross-section.

In this variant, the aforesaid sealing measures are not required. It is possible to use a hose of a readily available standard commercial quality.

The lubricant duct comprises slits extending at a slant to its center line and arranged so as to register with raceway regions of the carrier.

Similar to the aforementioned measures, these slits guarantee a controlled and economic supply of lubricant to the desired points of lubrication and can also be cut into the lubricant duct subsequent to its fabrication in a simple manner.

It is advantageous, to make the lubricant duct so that it is closed at both ends. This simple measure makes the provision of additional and complicated sealing means on the carrier and the head pieces superfluous.

The solution described here is not limited to linear guides only. It is conceivable to use it in all cases, for example also with rolling bearings for rotary motion, in which a lubricant or the like is transported through canals to respective points of consumption where a controlled and economic lubrication is required.

The scope of the invention is not limited only to the features of the claims, there existing also the possibility of combining individual features of the claims with the disclosure contained in the statement of advantages and in the description of the example of embodiment.

One example of embodiment of the invention is shown in the drawings and will be described more closely below.

FIG. 3 is a view of a lubricant duct with a double elastic sealing lip,

FIG. 4 is a sectional view taken along line IV—IV of FIG. 3,

FIG. 5 is a view of a lubricant duct with an annular cross-section, and

FIG. 6 is a cross-sectional view taken along line VI—VI of FIG. 5.

Figure 1:
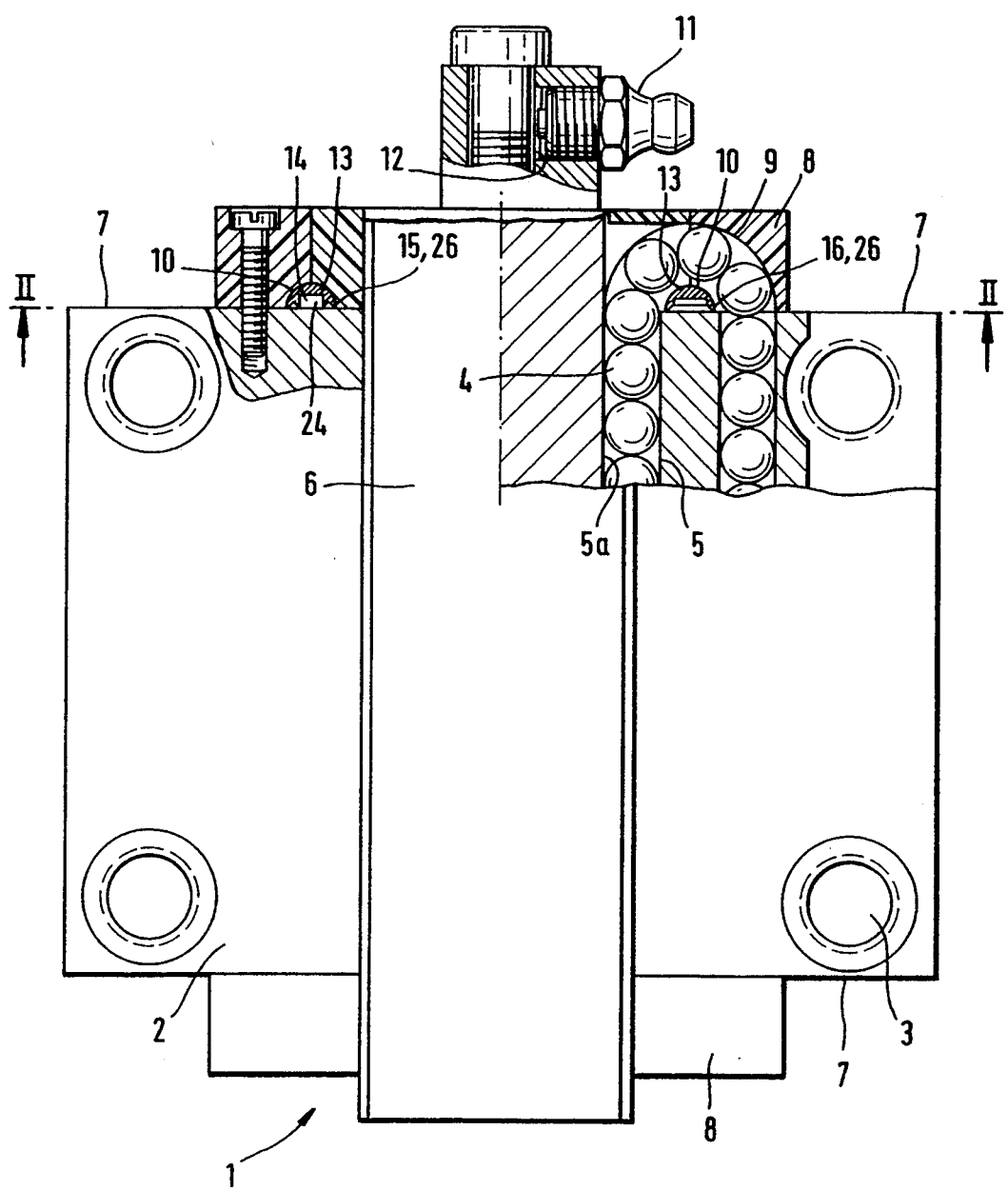
FIG. 1 is a top view of a rolling bearing according to the invention.

FIG. 1 is a top view of a rolling bearing 1 according to the invention comprising a carrier 2 on which parts, not represented, to be moved linearly can be fixed by screw connections 3. The carrier 2 is longitudinally displaceably mounted on pairwise arranged circuits of rolling elements 4 which are supported on raceways 5, 5a provided on the carrier 2 and on a guide rail 6.

The carrier 2 is closed at each of its front ends 7 by a head piece 8 made in this case of a plastic material. The head pieces 8 comprise deflecting regions 9 for the deflection of the rolling elements 4. At least one of the head pieces 8 comprises a canal 10 for supplying lubricant from a lubricating nipple 11 and a feed duct 12 to the rolling elements 4.

A separate lubricant duct 13 is inserted into the canal 10 of at least one of the head pieces 8. In the present embodiment, the lubricant duct 13 has a U-shaped cross-section and its lengthwise end which forms a radial opening 14 bears against the front end 7 of the carrier 2 by double elastic sealing lips 15. In a region of intended lubricant exit, namely in the region of the raceways 5, 5a for the rolling elements 4, the lubricant duct 13 is made as a single-lip sealing tip 16.

Figure 2:
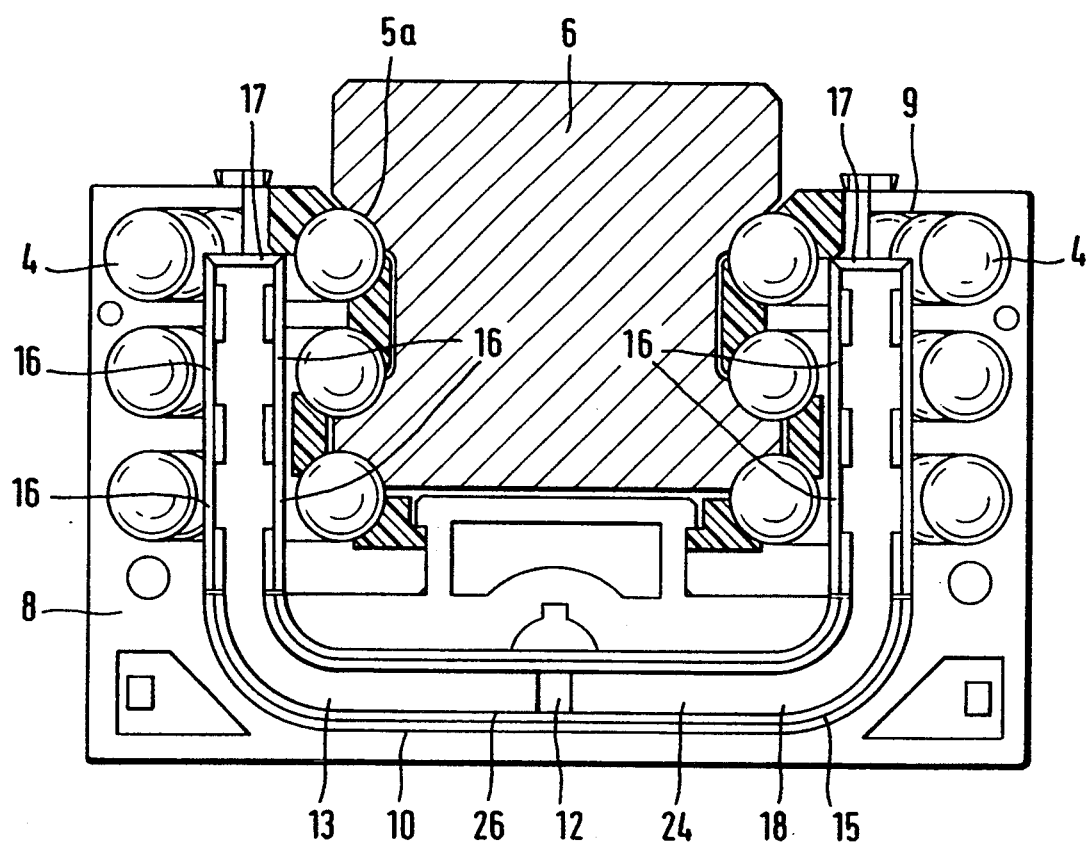
FIG. 2 is a cross-sectional view taken along line II—II of FIG. 1.

The mode of functioning of the rolling bearing 1 comprising the lubricant duct 13 of the invention will now be elucidated with the help of FIG. 2 which is a cross-sectional view taken along line II—II of FIG. 1.

It can be seen that the lubricant duct 13 is closed at its axial ends 17.

Lubricant is pressed into the lubricant duct 13 via a lubricating nipple 11 (s. FIG. 1) and a feed duct 12. This lubricant spreads out in a cavity 18 which, when lubricant is continued to be fed, builds up an overpressure in the lubricant duct 13. This overpressure causes the single-lip sealing lip 16 to yield by reason of its elasticity. The lubricant can now exit from the lubricant duct 13 in the regions of intended lubricant exit in the vicinity of the rolling elements 4 until the overpressure has been reduced to an extent that the single-lip sealing lip 16 is again closed, i.e. until the lubricant pressure in the lubricant duct 13 is similar to the lubricant pressure on the rolling element-side.

Since the rolling bearing 1 is sealed all around, the lubricant remains in the lubricant duct 13 until a subsequent lubrication pulse causes a renewed increase of pressure in the lubricant duct 13 and the process is repeated.

This also means that lubricant is transported only to the points where it is required, that is to say, to the points where the lubricant pressure on the rolling element-side is less than in the lubricant duct 13. Thus lubricant consumption is strongly minimized by using the rolling bearing 1.

FIG. 3 is a view of a lubricant duct 13 having a double elastic sealing lip 15. The structure of this is similar to that described with reference to FIGS. 1 and 2. However, the double elastic sealing lip 15 extends along the entire lengthwise end 20 of the lubricant duct 13. A controlled lubricant supply to the raceways 5, 5a of the rolling bearing 1 (s. FIGS. 1 and 2) is assured in this case with the help of slits 21.

FIG. 4 is a cross-sectional view taken along line IV—IV of FIG. 3. It can be seen that the lubricant duct 13 is made of a plastic material.

As can be seen in FIGS. 5 and 6, it is also possible for the lubricant duct 13 to have an annular cross-section 22. Advantageously, this lubricant duct 13 of the invention is provided with slits 23 extending at a slant to the center line of the lubricant duct 13. These slits 23 are likewise arranged in the region of the raceways 5, 5a of the rolling elements 4.

| List of Reference Numbers | |
| --- | --- |
| 1 | Rolling bearing |
| 2 | Carrier |
| 3 | Screw connection |
| 4 | Rolling element |
| 5 | Raceway |
| 5a | Raceway |
| 6 | Guide rail |
| 7 | Front end |
| 8 | Head piece |
| 9 | Region |
| 10 | Canal |
| 11 | Lubricating nipple |
| 12 | Feed duct |
| 13 | Lubricant duct |
| 14 | Opening |
| 15 | Sealing lip |
| 16 | Sealing lip |
| 17 | Ends |
| 18 | Cavity |
| 19 | not used |
| 20 | Lengthwise end |
| 21 | Slits |
| 22 | Cross-section |
| 23 | Slits |
| 24 | Cross-section |
| 25 | not used |
| 26 | Contact surface |

I claim:

1. A rolling bearing (1) for linear movement of a carrier (2) along a guide rail (6), said rolling bearing (1) comprising pairs of rolling element circuits supported on raceways (5,5a) on the carrier (2) and the guide rail (6), a head piece (8) comprising a region (9) for deflecting the rolling elements (4) being arranged at each front end (7) of the carrier (2), and at least one of said head pieces (8) comprising a canal (10) for feeding lubricant to the rolling elements (4) wherein a separate lubricant duct (13) made of an elastic polymeric material or any other elastic material and comprising radial openings (16,21,23) for lubricant exit is inserted into the canal (10)

of the head piece (8) wherein the radial openings (14) of the lubricant duct (13) are made in the form of slits (21).

2. A rolling bearing of claim 1 wherein the lubricant duct (13) has a substantially U-shaped cross-section (24) and its lengthwise end which forms an opening (14) bears against the carrier (2) via contact surfaces (26).

3. A rolling bearing of claim 1 wherein the lubricant duct (13) is made of a light-weight material.

4. A rolling bearing of claim 1 wherein contact surfaces (26) of the lubricant duct (13) which bear against the carrier (2) are configured as double elastic sealing lips (15) which, in regions of intended lubricant exit merge with single-lip elastic sealing lips 16.

5. A rolling bearing of claim 4 wherein lubricant exit regions in the lubricant duct (13) are arranged so as to register respectively with the raceways (5) of the carrier (2).

6. A rolling bearing of claim 1 wherein the lubricant duct (13) has a substantially annular cross-section (22).

7. A rolling bearing of claim 6 wherein the lubricant duct (13) comprises slits (23) which extend at a slant to its center line and are arranged so as to register with regions of the raceways (5) of the carrier (2).

8. A rolling bearing of claim 1 wherein the lubricant duct (13) is closed at both ends (17).

* * * * *